US009401816B2

(12) United States Patent
Gale (10) Patent No.: US 9,401,816 B2
(45) Date of Patent: Jul. 26, 2016

(54) PROTECTION RING IN AN AUTOMOTIVE NETWORK

(71) Applicant: Broadcom Corporation, Irvine, CA (US)

(72) Inventor: Benjamin Gale, Raleigh, NC (US)

(73) Assignee: Broadcom Corporation, Irvine, CA (US)

( * ) Notice: Subject to any disclaimer, the term of this patent is extended or adjusted under 35 U.S.C. 154(b) by 100 days.

(21) Appl. No.: 14/080,211

(22) Filed: Nov. 14, 2013

(65) Prior Publication Data

US 2015/0131431 A1     May 14, 2015

(51) Int. Cl.

| | |
|---|---|
| *H04L 12/24* | (2006.01) |
| *H04L 12/437* | (2006.01) |
| *H04L 12/751* | (2013.01) |
| *H04L 12/46* | (2006.01) |
| *H04L 12/703* | (2013.01) |
| *H04L 12/853* | (2013.01) |
| *H04L 12/851* | (2013.01) |
| *H04L 12/911* | (2013.01) |

(52) U.S. Cl.
CPC .......... *H04L 12/437* (2013.01); *H04L 12/4641* (2013.01); *H04L 45/02* (2013.01); *H04L 45/28* (2013.01); *H04L 47/2416* (2013.01); *H04L 47/2433* (2013.01); *H04L 47/822* (2013.01)

(58) Field of Classification Search
None
See application file for complete search history.

(56) References Cited

U.S. PATENT DOCUMENTS

| | | | |
|---|---|---|---|
| 2008/0288638 A1* | 11/2008 | Diab et al. ..................... | 709/225 |
| 2012/0069744 A1* | 3/2012 | Krzanowski et al. ......... | 370/252 |
| 2012/0307625 A1* | 12/2012 | Ravindran et al. ............ | 370/222 |

* cited by examiner

*Primary Examiner* — Feben M Haile
(74) *Attorney, Agent, or Firm* — Sterne, Kessler, Goldstein & Fox PLLC (57) ABSTRACT

A system and method to provide a protection ring in an Audio Visual Bridging (AVB) network is provided. The method includes the steps of monitoring a first status of links coupled to a plurality of devices in a ring network, receiving a second status of links of other devices in the ring network, and signaling devices in the ring network to generate a logical loop-free topology based upon a stored static physical configuration, the first status of the links and the second status of links of other network devices in the ring network. The method also includes the step of determining an allocation of flows to links based on stored flow characteristics. Determining an allocation of flows to links includes programming a transmit scheduler to provide a first percentage of bandwidth for Audio Video Bridging (AVB) flows while reserving a second percentage of bandwidth for non-AVB flows. The method further includes programming a forwarding unit to forward flows to their destination based on the logical loop-free topology.

20 Claims, 7 Drawing Sheets

PROTECTION RING IN AN AUTOMOTIVE NETWORK

BACKGROUND OF THE DISCLOSURE

1. Field of the Disclosure

This application generally relates to a protection ring in an automotive network.

2. Background Art

Ethernet is increasingly being positioned and deployed in automotive networks that are operating using an Audio Video Bridging (AVB) protocol. Most initial deployments are for infotainment (such as Digital Video Disk (DVD), audio, satellite radio) and driver assist applications (e.g. Global Positioning Satellite (GPS) and rear-facing camera), and traffic is mostly multi-media in nature. However, AVB is also being looked at for in-vehicle control traffic, which is characterized by the need for low-bandwidth, guaranteed delivery with low-latency and high availability, including very fast failover recovery. Typically, failover recovery has to be less than 50 ms. However, AVB networks do not provide good solutions for fast failover recovery.

BRIEF DESCRIPTION OF THE DRAWINGS AND FIGURES

Reference will be made to the embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments.

The embodiments of the disclosure will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION

This specification discloses ore or more embodiments that incorporate the features of the disclosure. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For clarity and ease of illustration, not all functional blocks are illustrated in detail because these items are known to those of ordinary skill in the art, and are further defined in well-known standards. Furthermore, it is to be appreciated that similar or substitute functional blocks may be used to implement embodiments of the disclosure without deviating from the scope of the present disclosure.

Figure 1A:
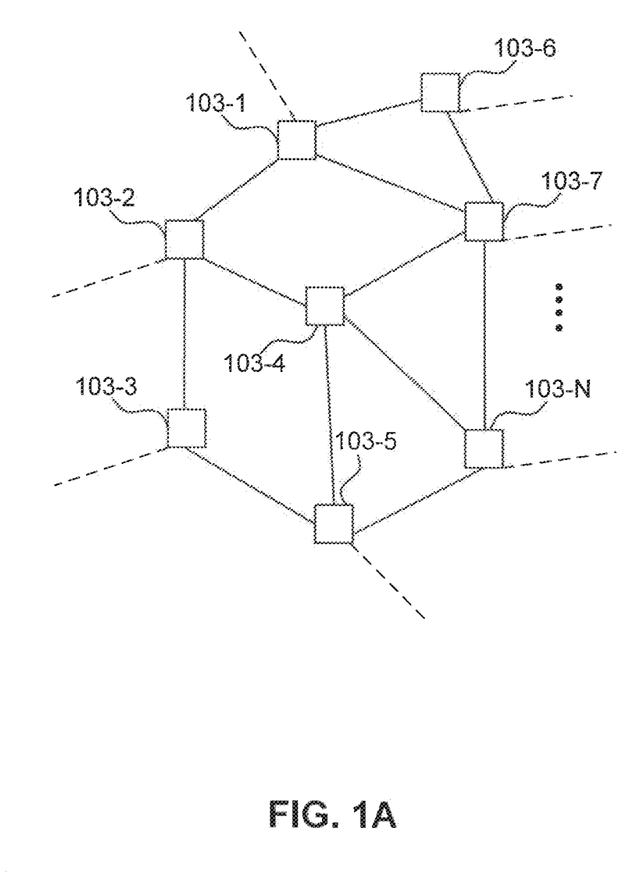
FIG. 1A illustrates an example Local Area Network (LAN).

FIG. 1A illustrates an example Local Area Network with communication devices 103-1 to 103-N coupled together. The communication devices 103 may be switches, routers or any type of device that can send and/or receive messages. Communication devices 103 may be alternatively referred to as "devices", "network devices", or "switches" herein. In an example, the communication devices are AVB switches.

A drawback of large LAN networks, such as in FIG. 1A, is that devices 103 may join or leave the network. For example, a user may connect their device 103, such as a laptop, router or a WiFi enabled device such as a cellular phone to the network for a period of time and then disconnect after using the network. Therefore, the physical configuration (i.e. how the communication devices are physically connected) of the Local Area Network is not static and is constantly changing. Due to the nature of the dynamic configuration of a Local Area Network, the devices 103 in the LAN do not have explicit knowledge of either the physical topology of the LAN, or the flows in the LAN. For example, typically the devices 103 do not build or store a static database of flows since they do not know which devices are joining or leaving the LAN.

A "flow" or "traffic flow", as the term is used herein, refers to a sequence of data packets that are related. Traffic flows may be defined at various levels of granularity. For example, a flow may be created between a source and a destination (e.g., between a source address and a destination address), or between a program running on a source and a program on a destination (e.g., between source and destination addresses, between port numbers or between different protocols). The addresses may be at the layer 2 media access control layer (MAC layer addresses), network layer (e.g. IP addresses), or other higher layer address. Port numbers or protocol identifiers can identify particular applications. The destination of a flow may be a single node or multiple nodes, such as in multicast flows from a source to multiple destinations. In an example, packets originating from a particular application to a given set of one or more application destinations can constitute a flow. Similarly, audio packets may constitute an audio flow, video packets a video flow, and data packets a data flow.

Figure 1B:
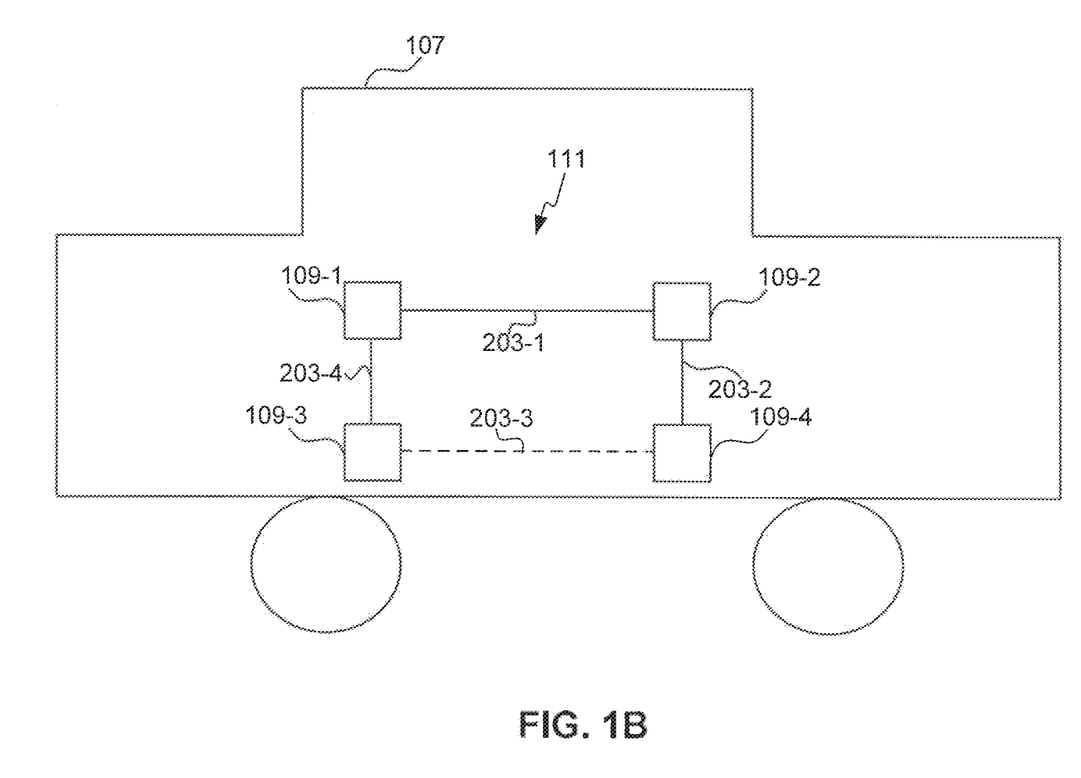
FIG. 1B illustrates an example of an AVB network in an automotive vehicle.

FIG. 1B illustrates an example of a network in a vehicle 107. The vehicle may be, for example, any type of transportation vehicle such as a car, airplane, train, or ship. The network in FIG. 1B includes devices 109-1 to 109-4 coupled together in a ring configuration 111. A ring configuration of devices 109 may also be referred to as a ring network, ring topology, or configuration herein. While FIG. 1B shows four devices 109 in a ring configuration for simplicity, there can be any number of device 109 in the ring configuration. The ring configuration 111 may run an AVB protocol and be referred to as an AVB network. A network formed by the devices in the ring configuration 111 in a vehicle 107 may be referred to as a vehicle network or network herein.

In a vehicle network, which is static by nature, devices 109 are not joining or leaving the network and are therefore typically in a static physical configuration of a ring. Furthermore, in a vehicle network, because the physical topology of the network and the flows it must carry is static, it is possible in embodiments presented herein for each of the devices 109 to be provisioned with a static database of the physical network topology and the flows that the device will carry. Provisioning a static database of physical network topology and flows entails storing a physical topology map for the vehicle network along with a database of incoming and outgoing flows and their characteristics such as required bandwidth, priority level, and connection points to the network.

AVB introduces traffic classes that offer delivery and latency guarantees for traffic of a particular class. For example, video flows form a first class and audio flows form a second class that are provided guaranteed bandwidth to support respective bandwidth needs. In AVB networks, in order to offer such guarantees, each device on the end-to-end path must specifically accept and provision bandwidth for each flow in the class. The network may also carry an amount of non-critical, non-AVB traffic that may be carried on a best-effort basis. For example, a car may include an Ethernet jack in the passenger compartment through which a passenger might connect to the Internet. In another example, the vehicle may include a WiFi connection for portable devices such as tablets, laptops, or phones. AVB specifically allows for such traffic to be carried on spare bandwidth in the network, while guaranteeing undisrupted service for the AVB flows.

Ethernet is increasingly being positioned and deployed in vehicle networks. Most initial deployments are for infotainment (such as DVD, audio, satellite radio) and Driver Assist applications (e.g. Global Positioning Satellite (GPS) and rear-facing camera), and traffic is mostly multi-media in nature. However, it is also being looked at for in-vehicle control traffic, which is characterized by the need for low-bandwidth, guaranteed delivery with low-latency and high availability, including very fast failover recovery. Failover recovery is when a link in the automotive network fails and an alternate route in the network needs to be configured to route data traffic from the failed link. Typically failover recovery has to be less than 50 ms. While AVB standards today solve guaranteed delivery with low-latency, they do not provide good solutions for the high-availability requirement. The standard methods for redundancy in AVB networks today would be to run a Rapid Spanning Tree Protocol (RSTP) at the Ethernet layer to generate a loop-free topology, and then use AVB Stream Reservation Protocol (SRP) to dynamically re-build AVB stream provisioning on top of the new Ethernet topology. The problems with this method in an automotive environment are that it takes too long to re-build the AVB stream reservations since even a delay of several seconds in an automotive network can be unacceptable. Vehicle networks are characterized by the need for low-cost and power, and for very fast initialization, i.e. they should be Ethernet ready and AVB provisioned within 150 ms of power being applied. Typically failover recovery when a link fails should be less than 50 ms One possibility is to use RSTP or its variant to manage the redundant Ethernet topology, and then applying the AVB stream static provisioning on top of that. The problem with this is that AVB stream provisioning requires physical network topology awareness, and RSTP is not a routing protocol i.e. each device looks after its own port states, but does not build an end-to-end map of paths through the network. This introduces complexities and delays in anything other than a trivial network, and it is not clear that failover recovery as low as 50 ms can be achieved. Another possibility is more complex protocols such as Shortest Path Bridging, but these add complexity and cost.

Therefore, the embodiments presented herein provide an AVB redundancy solution in vehicle networks that is simple to resolve, fast in failover recovery, simple to statically provision streams, and offers sufficient bandwidth to meet the requirements of control traffic. To achieve this, embodiments presented herein setup network devices in a physical ring configuration, implement a logical loop-free topology in the ring configuration, and apply AVB stream provisioning based on a known database of flow characteristics within the ring configuration. When a link within the ring configuration fails, the embodiments allow for re-configuration of the logical loop-free topology without use of a spanning tree protocol, and apply new AVB stream reservations to the re-configured logical loop-free topology.

Figure 2A:
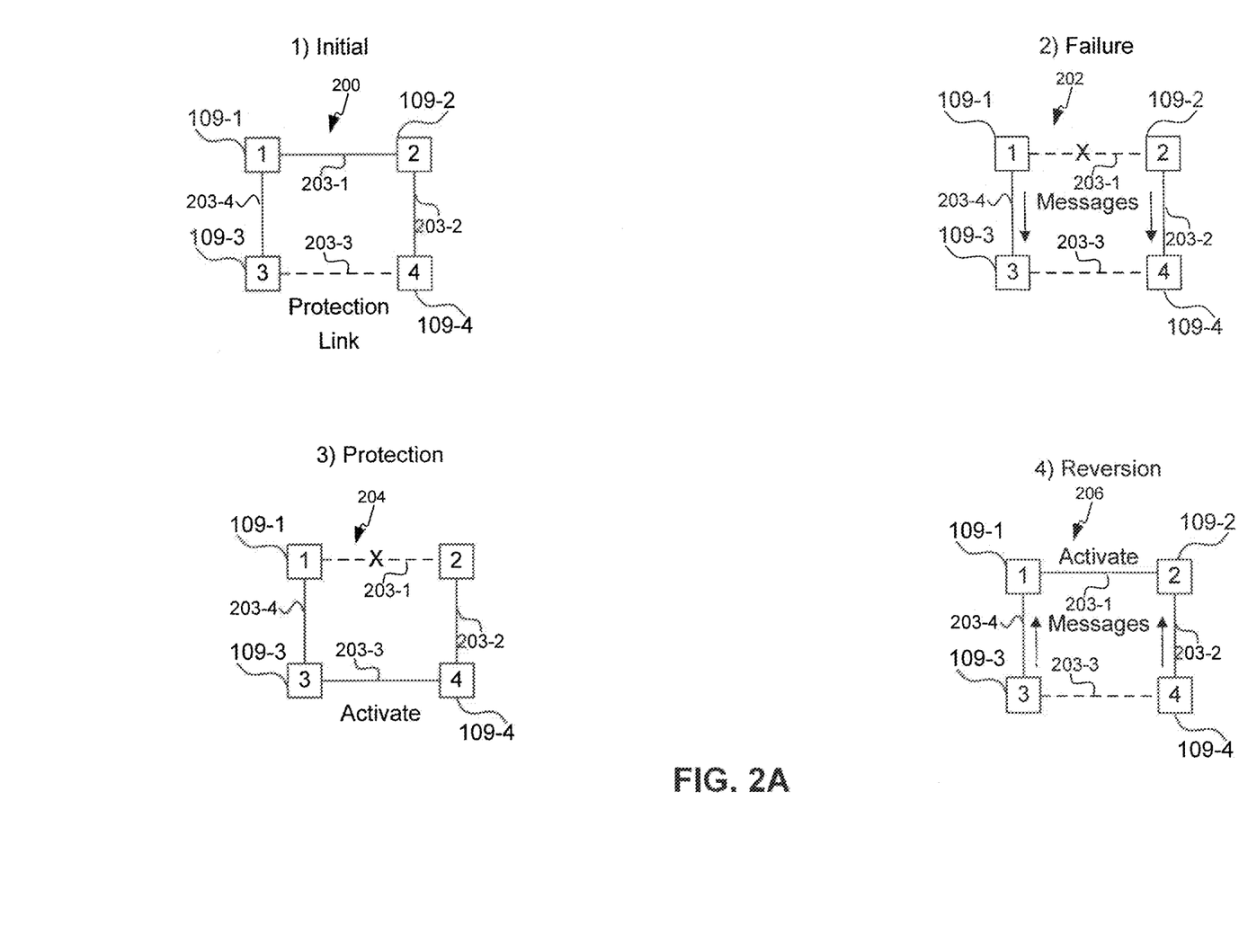
FIG. 2A illustrates an example of a loop-free topology in a ring network according to an embodiment of the disclosure.

FIG. 2A illustrates an example of a loop-free topology in a ring network according to an embodiment of the disclosure.

In example configuration 200, devices 109 are in a ring configuration and coupled together with links 203. A loop may occur in configuration 200 if all links 203 are active. If all the links 203 are active a message may circulate within the ring network continuously thereby creating a loop that may crash the network. To create a loop-free topology, link 203-3 is logically disabled and designated as a protection link. Logically disabling link 203-3 means that data is not transmitted between devices 109-3 and 109-4 even though they are physically connected thereby preventing a loop. According to an embodiment, at initialization, each device 109 independently generates the same logical loop-free topology based on a database of the static physical network topology and a current status of links 203.

When a link failure occurs, for example in configuration 202 if link 203-1 fails, messages need to be rerouted while maintaining a loop-free topology. According to an embodiment, upon link failure, the devices on each side of the link send a protocol message to other devices in the network indicating link failure. For example, devices 109-1 and 109-2 send protocol messages to devices 109-3 and 109-4 indicating that link 203-1 has failed. The protocol messages may be for example Operation, Administration, and Management (OAM) messages or dynamic protocol packets. Communication of link status information may also be done via a link status signal or an end-to-end OAM protocol such as IEEE 802.1ag. The network now needs to be re-configured to generate a new loop-free topology as shown in example configuration 204.

In configuration 204, upon receiving the protocol message from devices 109-1 and 109-2, devices 109-3 and 109-4 on either side of protection link 203-3 activate protection link 203-3. Link 203-1 is now designated as a protection link and link 203-3 has been activated. Each device 109 along the path knows the new logical loop-free topology due to the transmission of protocol messages indicating which link has failed and by independently generating the new logical loop-free topology based on the current status of links 203. Conventional Ethernet systems may use a spanning tree protocol (STP) where each device messages every other device in the network to determine a new link for transmission and/or a new protection link. This results in a very slow reconfiguration of the network along with difficulty in determining the new logical topology since the devices cannot generate the new logical topology independently based on status of links in the network. In comparison, the transmission of protocol messages as described above to indicate link status without use of (STP) is very fast because only devices whose local link has failed message other devices notifying them of the failure as opposed to each device messaging every other device to agree on a new logical topology in conventional networks. In embodiments presented herein, upon receiving messages indicating a failed link, each device 109 can independently derive the same new logical loop topology because the physical ring topology and current status of links 203 is known by each device 109, with recovery due to a failed link taking less than 50 ms. In an example, if link 203-1 becomes active again, link 203-3 may again be designated as the protection link and logically disabled as shown in configuration 206 and link 203-1 is active again.

Figure 2B:
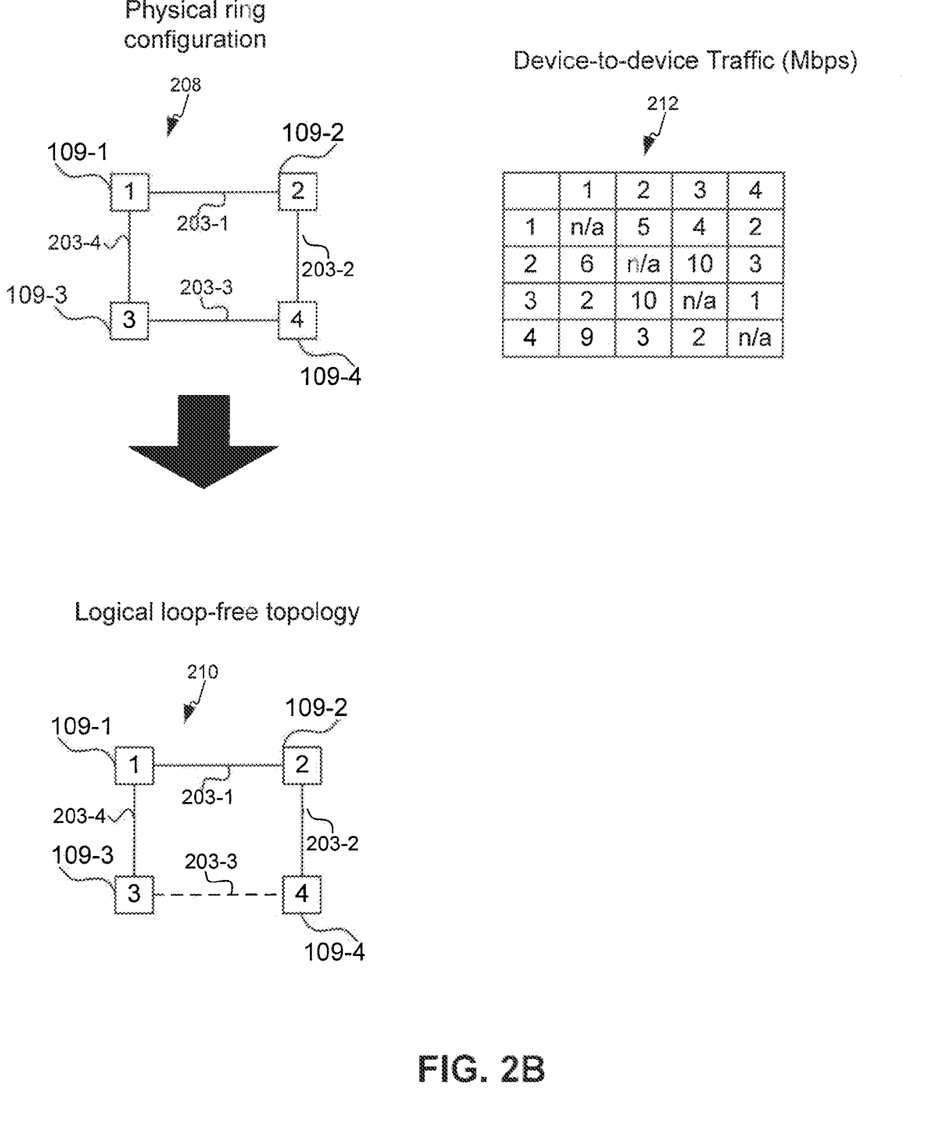
FIG. 2B illustrates an example selection of a protection link according to an embodiment of the disclosure.

FIG. 2B illustrates an example selection of a protection link according to an embodiment of the disclosure. FIG. 2B illustrates example physical ring configuration 208 and logical loop-free topology 210. FIG. 2B also illustrates an example device-to-device traffic table 212. Table 212 may be stored in memory 308. Alternatively, processor 306 may build table 212 based on monitoring traffic between devices 109 or based on an exchange of messages between devices 109.

Configuration 208 illustrates the physical topology of the ring network where devices 109-1 to 109-4 are actually physically connected via links 203-1 to 203-4. The rows and columns of table 212 indicate traffic between nodes 109-1 to 109-4. For example, node 109-1 sends traffic of 5 Mbps to node 109-2 and node 109-2 sends traffic of 6 Mbps to node 109-1. According to an embodiment, the link 203 that conducts the least amount of traffic is designated as the protection link. In table 212, the least amount of traffic is between devices 109-3 and 109-4. Device 109-3 sends 1 Mbps of traffic to device 109-4 and device 109-4 sends 2 Mbps of traffic to device 109-3. Therefore, link 203-3 is selected as protection link in logical loop-free topology 210. It is to be appreciated that other methods to select a protection link may be used to generate the logical loop-free topology such as an arbitrary selection of a protection link.

Once a loop-free topology has been established, AVB stream reservations are established based on the known database of flows in the network. In a LAN network such as that shown in FIG. 1A, each of the devices 103 do not have a database of flow characteristics of flows in the network due to the dynamic nature of the network where devices 103 may join or leave the network, and therefore a flow database must be built in such conventional networks using a dynamic protocol running between devices on the network. This can take several seconds which is too long for an automotive network. However, in a static vehicle network, the devices 109 in the ring configuration are cognizant of the flow characteristics of flows in the network through pre-configuration such as a storing a database of flow characteristics in a memory. Such flow characteristics may include, for example, source address, destination address, Virtual Local Area Network (VLAN) Identification (ID), minimum bandwidth requirement, AVB traffic class, stream priority level and connection points into a network for each flow. The connection points as described herein are identities of source and destination switches to which a flow connects. For instance, a flow may start from a station (not shown) that connects to a device 109-1 and is destined to another station (not shown) connected to device 109-3. This information is needed so that each device 109 can determine the path in the logical topology for a flow to be transmitted from one station to another station.

Embodiments presented herein determine an allocation of flows to links based on stored flow characteristics such that a sum of bandwidth for flows allocated to a link provides bandwidth for the flows without exceeding the bandwidth capacity for the link. An allocation of flows to links is based on stored flow characteristics and involves programming a forwarding database of the device such that flows are forwarded towards their destination. The allocation also entails programming traffic shapers such that the AVB Class A and Class B flows get sufficient bandwidth while still providing bandwidth for other flows. For example, Class A flows include vehicle control data such as braking system data and Class B flows include multi-media such as audio and video traffic. Other flows may be an Ethernet flow or a Global Positioning Satellite flow. The traffic shaper may be a per ring port AVB credit-based shaper.

Static provisioning of flows to egress ports according to embodiments presented herein for an AVB ring network involves determining at each device the links 203 available towards the destination device(s) 109, aggregating flows per-port-per-class across all streams, and applying the bandwidth reservations to links such that each class can be provisioned with sufficient bandwidth for transmission. Unlike the arbitrary topologies such as in FIG. 1A, in a ring configuration determining available local ports/links towards destinations devices is possible since each device 109 (by monitoring link status and dynamic protocol messages) knows which link 203 has failed (e.g. the protection link or another failed link) and therefore, with physical topology and flow pre-provisioning, can determine the path to each destination device.

Figure 3:
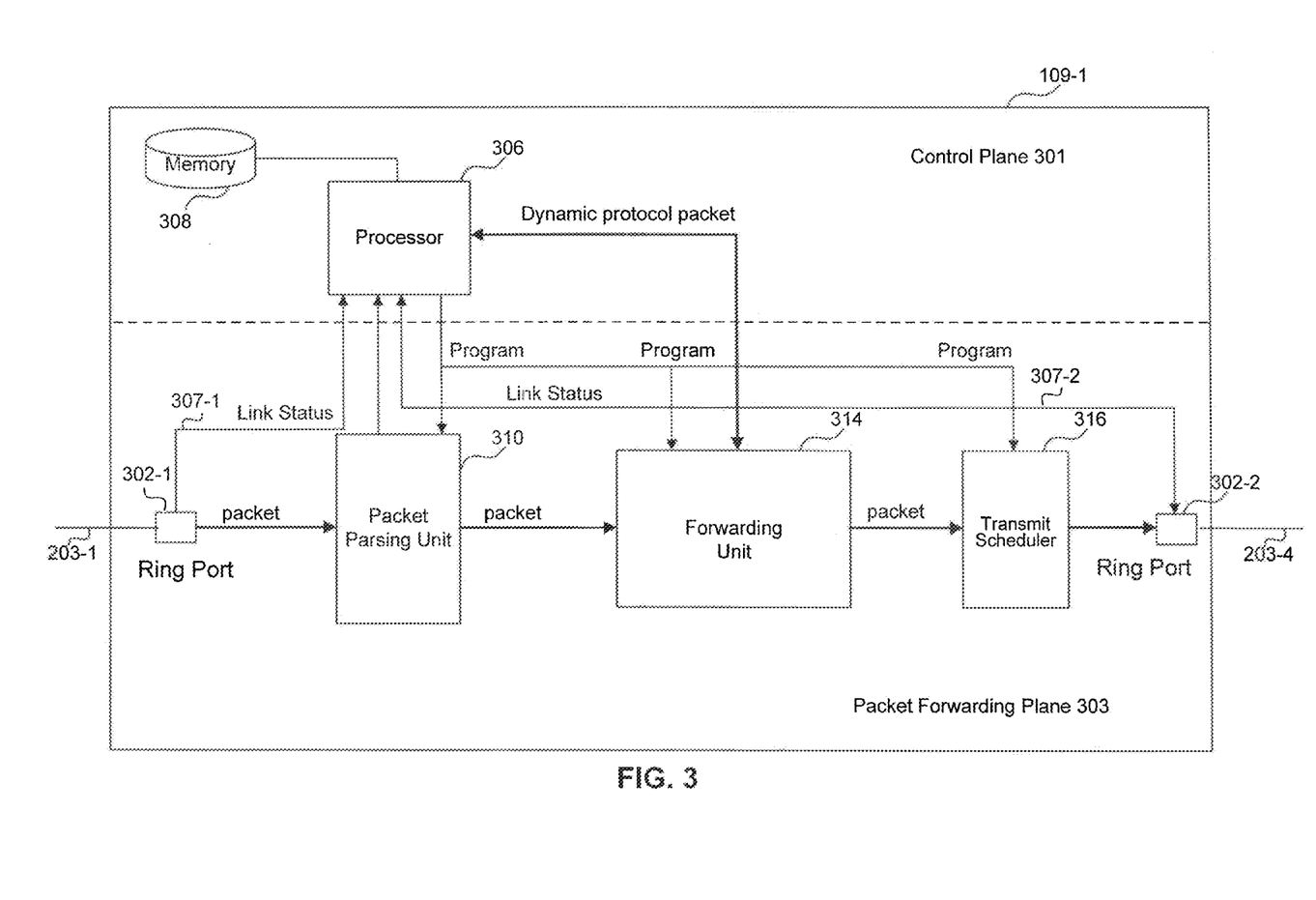
FIG. 3 illustrates a network device in further detail according to an embodiment of the disclosure.

FIG. 3 illustrates a device 109-1 in further detail according to an embodiment of the disclosure. Device 109-1 includes a control plane 301 and a packet forwarding plane 303. Control plane 301 includes a processor 306 coupled to a memory 308. The packet forwarding plane 303 includes ring ports 302-1 and 302-2 for connection to other devices 109 in network 111. The ring ports 302 can be used for both ingress and egress. For an ingress route each ring port 302 is coupled to packet parsing unit 310 that is in turn coupled to a forwarding unit 314. Forwarding unit 314 is coupled to a transmit scheduler 316. Transmit scheduler 316 can be programmed by processor 306 to provide bandwidth for AVB class A and class B flows while also providing sufficient bandwidth for remaining flows such as Ethernet, GPS, WiFi etc. Processor 306 is coupled to the ring ports 302, packet parsing unit 310, forwarding unit 314, and the transmit scheduler 316, thereby coupling control plane 301 to packet forwarding plane 303. Although FIG. 3 is described using device 109-1 as an example, the same components and methods are applicable to any of the other devices 109 in the ring network.

According to an embodiment, memory 308 stores a static physical network topology, for example of ring network 111 (see FIG. 2A), and a static database of flow characteristics of flows in the network. The stored flow characteristics include source address, destination address, Virtual Local Area Network (VLAN) Identification (ID), minimum bandwidth requirement, AVB traffic class, stream priority level and connection points to the network.

In an alternative embodiment, processor 306 may dynamically generate a database of flows in the device 109 and their corresponding source address, destination address, VLAN ID, minimum bandwidth requirement, AVB traffic class, stream priority level and connection points by parsing fields of incoming network protocol packets provided by packet parsing unit 310.

Memory 308 also stores instructions that when executed by the processor 306 cause the processor 306 to monitor the status of the links 203-1 and 203-4 via link status signals 307 supplied by ring ports 302. Processor 306 also receives status of links of other devices 109 in the ring network 111 by parsing fields of incoming network protocol packets received from other devices 109. These network protocol packets may be referred to as dynamic protocol packets and may be forwarded by forwarding unit 314 to processor 306 for determining the logical loop-free topology as needed.

In a first embodiment, on initialization, processor 306 of each device 109 generates a logical loop-free topology based upon the stored static physical network configuration in memory 308 and the status of local links 203 only. For example, device 109 generates a logical loop-free topology based upon the stored static physical network configuration in memory 308 and only the status of local links 203-1 and 203-4 which are received via ring ports 302. In this embodiment, the processor 306 of device 109-1 does not wait to receive the status of remote links of other devices such as links 203-2 and 203-4 via dynamic protocol packets. This results in a fast resolution of the logical loop-free topology at start-up without the need for a time-out period where dynamic protocol messages are exchanged. If there happens to be a failure in links 203-2 and 203-4 at startup then it can be signaled to device 109-1 via the dynamic protocol packets and a new logical loop-free topology can be configured by device 109-1.

In a second embodiment, at initialization, processor 306 of each device 109 generates a logical loop-free topology based upon the stored static physical network configuration in memory 308, the status of local links and the status of links remote to the device 109. For example, device 109-1 generates a logical loop-free topology based upon the stored static physical network configuration in memory 308, the status of local links 203-1 and 203-4 which are received via ring ports 302 and the status of links remote to the device 109 such as links 203-2 and 203-3 received via dynamic protocol messages. In this embodiment, each device 109 has to wait for the dynamic protocol packets before forming the loop-free topology during initialization. This takes longer than forming the loop-free topology based solely on the status of local links but results in the correct logical-loop free topology in the event of any link failure in the network at startup.

According to an embodiment, based on the stored static physical network configuration and status of links 203, each device 109 will individually arrive at the same logical loop-free topology without having to recursively exchange messages with every other device 109 in the network as is done in conventional networks that use RSTP. Processor 306 determines and programs an allocation of flows to links 203-1 and 203-4 in forwarding unit 314 and transmit scheduler 316 based on stored flow characteristics in memory 308 such that each AVB class is provisioned. Provisioning or allocating according to embodiments presented herein involves programming the forwarding unit 314 such that flows are forwarded towards their destination based on the logical loop-free topology. Provisioning also entails programming transmit scheduler 316 such that AVB Class A and Class B flows get sufficient bandwidth, but are hardware-limited such that other traffic classes are not starved for bandwidth. Processor 306 also determines whether link 203-1 or link 203-4 has failed based on a link status signal 307. Upon detecting that link 203-1 has failed (as shown in configuration 202 in FIG. 2A), processor 306 signals devices 109-2, 109-3, and 109-4 in the ring network 111 to generate a new logical loop-free topology (as shown in configuration 204 in FIG. 2A) based upon the stored static physical network configuration of ring network 111 and the status of links 203-2, 203-3, and 203-4. Processor 306 may propagate status of failed link 203-1 throughout the ring network 111 through a protocol exchange message such as a dynamic protocol packet. In an embodiment, processor 306 does not use a spanning tree protocol (STP) to determine the new logical loop-free topology since the physical configuration of ring network 111 is static and stored in memory 308. Processor 306 also determines a new allocation of flows to link 203-4 based on stored flow characteristics such that each AVB class is correctly provisioned on each link. Upon re-assigning flows to egress link 203-4, processor 306 may program packet parsing unit 310 to assign packets of higher priority flows to link 203-4 and drop packets of lower priority flows if link 203-4 does not have sufficient bandwidth for both higher and lower priority flows.

In an example, in configuring a logical loop-free topology and provisioning flows to links, processor 306 will program forwarding unit 314 and transmit scheduler 316. For example, for configuration 200 in FIG. 2A, processor 306 in device 109-1 may program forwarding unit 314 to use both links 203-1 and 203-4 since they are both active links. For configuration 202, processor 306 in device 109-1 may program forwarding unit 314 to only use link 203-4 since link 203-1 has failed. This significantly speeds up packet forwarding since there is no further software interaction via processor 306 in the forwarding process unless there is another change in the configuration of the network due to link failure or reversion when a failed link re-activates.

Figure 4:
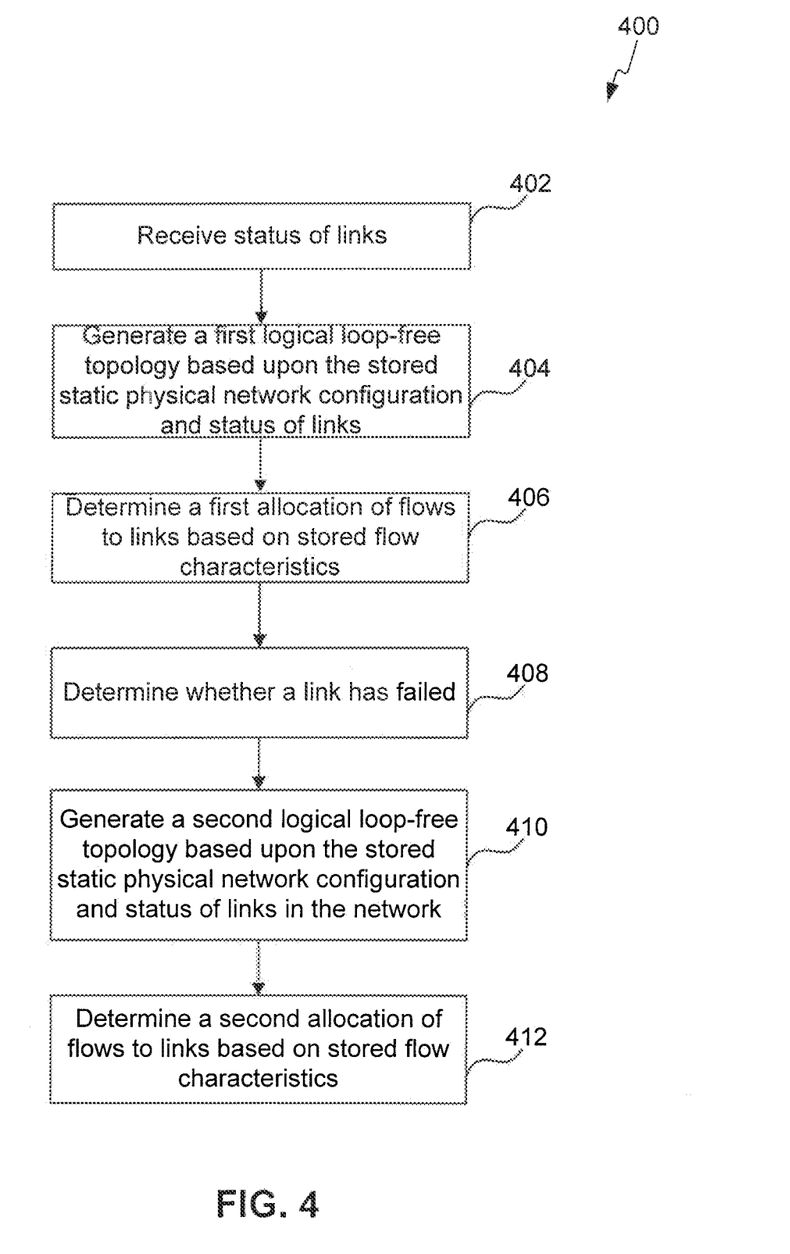
FIG. 4 illustrates an example flowchart illustrating steps performed to implement a protection ring in an AVB network according to an embodiment of the disclosure.

FIG. 4 illustrates an example flowchart 400 illustrating steps performed to implement a protection ring in an AVB network according to an embodiment of the disclosure. Flowchart 400 will be described with continued reference to the example operating environment depicted in FIGS. 1B-3. However, the flowchart is not limited to these embodiments. Note that some steps shown in flowchart 400 do not necessarily have to occur in the order shown. The steps in FIG. 4 are performed, for example, by a device 109. It is also to be appreciated that for clarity and ease of illustration, not all steps are illustrated in detail in the flowcharts in FIG. 4 because these items are known to those of relevant skill in the art, and are further defined in well-known standards. Furthermore, it is to be appreciated that similar or substitute steps may be used to implement embodiments of the disclosure without deviating from the scope of the present disclosure.

In step 402, on initialization, a link status signal and/or messages are received that indicates a status of a device's local links and of links of other devices in the network. For example, link status signals 307-1 and 307-2 in device 109-1 respectively indicate a status of links 203-1 and 203-4. Links 203-1 and 203-4 are local to device 109-1 since they are directly connected to device 109-1. In an example, status of non-local or remote links of other devices such as links 203-2 and 203-3 may also be received via dynamic protocol messages from one or more of devices 109-2, 109-3, and 109-4 to help determine the logical loop-free topology.

In step 404, each device in the ring network generates a logical loop-free topology based upon its knowledge of active links in the network. For example, as seen in configuration 200 in FIG. 2A, a loop-free topology is generated with link 203-3 designated as the protection link.

In step 406, an allocation of flows to links is determined based on stored flow characteristics in memory 308 such that each AVB flow along with other flows is provisioned. In an example, processor 306 determines the bandwidth allocation for flows to links based on flow characteristics stored in memory 308.

In step 408, it is determined whether a link has failed. For example, it is determined whether a link has failed based on link status signals 307. As shown in configuration 202, link 203-1 has failed. Local link failure may be received via, for example, link status signals 307.

In step 410, devices are signaled in the ring network to indicate a failed link and a second logical loop-free topology is generated based upon the stored static physical network configuration and the status of the links in the ring network. For example, devices 109 with failed local links will send the status of their local links to other devices 109 via dynamic protocol messages. Each device 109 will then independently derive the second logical loop-free topology based on the status of the failed links and the available links in the network. For example, as shown in configuration 204, link 203-3 is switched from a protection link to an active link and failed link 203-1 is switched to a protection link.

In step 412, a second allocation of flows to links for the new logical loop=free topology is determined based on stored flow characteristics such that each AVB flow along with other flows is provisioned. For example, processor 306 determines the bandwidth allocation for flows based on flow characteristics stored in memory 308.

Example General Purpose Computer System

Embodiments presented herein, or portions thereof, can be implemented in hardware, firmware, software, and/or combinations thereof.

The embodiments presented herein apply to any communication system between two or more devices or within subcomponents of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 5:
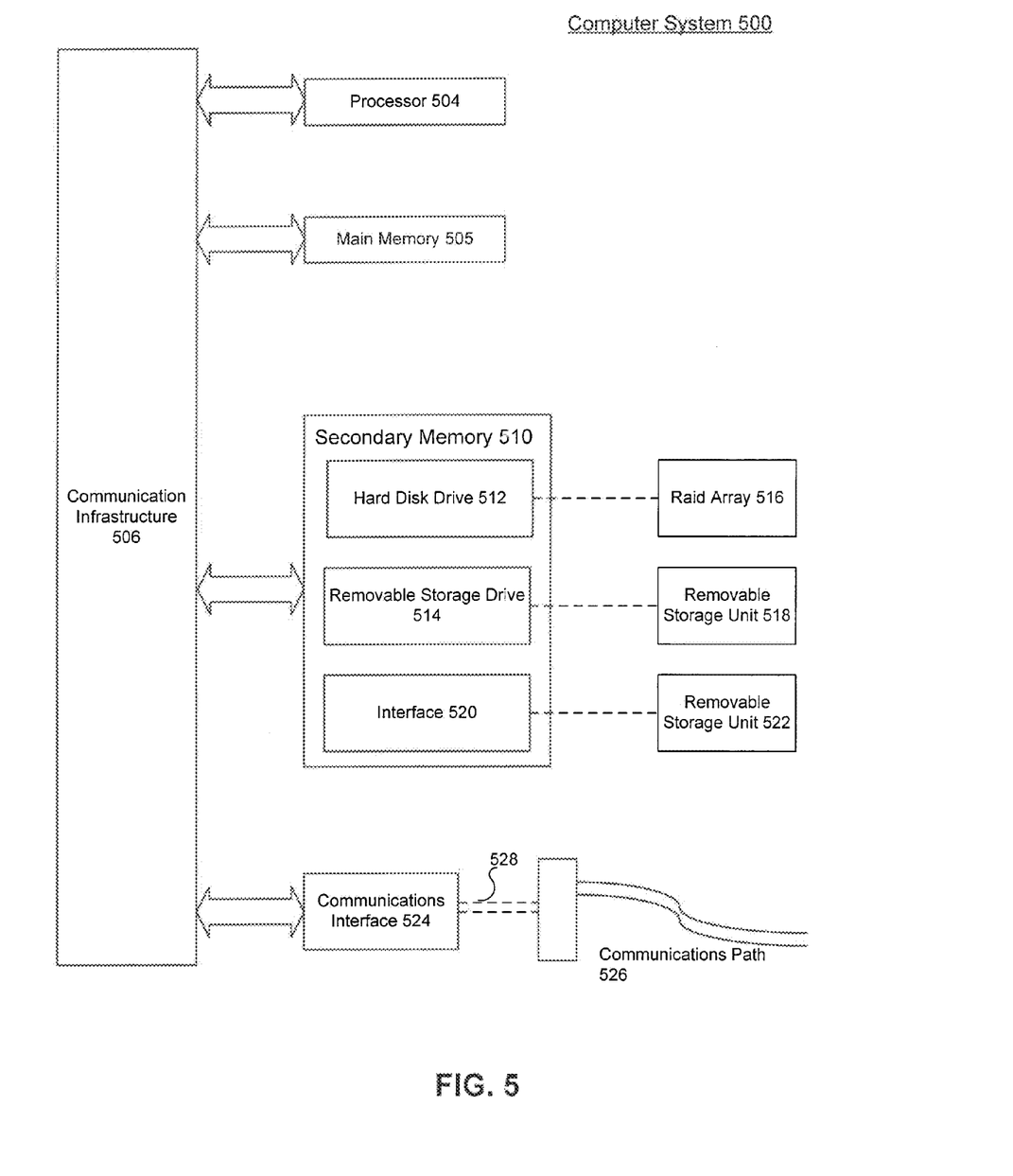
FIG. 5 is a block diagram of a computer system on which the present disclosure can be implemented.

The following describes a general purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 500 is shown in FIG. 5. The computer system 500 includes one or more processors, such as processor 504. Processor 504 can be a special purpose or a general purpose digital signal processor. The processor 504 is connected to a communication infrastructure 506 (for example, a bus or network). Various software implementations are described in terms of this exemplary computer system. After reading this description, it will become apparent to a person skilled in the relevant art how to implement the disclosure using other computer systems and/or computer architectures.

Computer system 500 also includes a main memory 505, preferably random access memory (RAM), and may also include a secondary memory 510. The secondary memory 510 may include, for example, a hard disk drive 512, and/or a RAID array 516, and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc. As will be appreciated, the removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a PCMCIA slot and card, etc. Software and data transferred via communications interface 524 are in the form of signals 528 which may be electronic, electromagnetic, optical or other signals capable of being received by communications interface 524. These signals 528 are provided to communications interface 524 via a communications path 526. Communications path 526 carries signals 528 and may be implemented using wire or cable, fiber optics, a phone line, a cellular phone link, an RF link and other communications channels.

The terms "computer program medium" and "computer usable medium" are used herein to generally refer to media such as removable storage drive 514, a hard disk installed in hard disk drive 512, and signals 528. These computer program products are means for providing software to computer system 500.

Computer programs (also called computer control logic) are stored in main memory 505 and/or secondary memory 510. Computer programs may also be received via communications interface 524. Such computer programs, when executed, enable the computer system 500 to implement the present disclosure as discussed herein. In particular, the computer programs, when executed, enable the processor 504 to implement the processes of the present disclosure. For example, when executed, the computer programs enable processor 504 to implement part of or all of the steps described above with reference to the flowcharts herein. Where the disclosure is implemented using software, the software may be stored in a computer program product and loaded into computer system 500 using raid array 516, removable storage drive 514, hard drive 512 or communications interface 524.

In other embodiments, features of the disclosure are implemented primarily in hardware using, for example, hardware components such as Application Specific Integrated Circuits (ASICs) and programmable or static gate arrays. Implementation of a hardware state machine so as to perform the functions described herein will also be apparent to persons skilled in the relevant art(s).

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A device in a ring network, the device comprising:
a processor; and
a memory coupled to the processor, wherein the memory stores a static physical configuration of the ring network, flow characteristics of flows in the ring network, and instructions that when executed by the processor cause the processor to:
receive a first status of links local to the device;
receive a second status of links associated with other devices in the ring network via protocol messages;
independently generate a same logical loop-free topology as the other devices in the ring network based on the stored static physical configuration, the first status of the links local to the device and the second status of the links associated with the other devices in the ring network; and
determine an allocation of flows to the links local to the device based on the stored flow characteristics.

2. The device of claim 1, wherein the flows comprise Audio Video Bridging (AVB) flows and non-AVB flows, and wherein the device further comprises:
a transmit scheduler, wherein the memory further includes instructions that when executed by the processor cause the processor to determine the allocation of the flows to the links local to the device by programming the transmit scheduler to provide a first percentage of bandwidth for AVB flows while reserving a second percentage of bandwidth for non-AVB flows.

3. The device of claim 1, further comprising:
a forwarding unit, wherein the memory further includes instructions that when executed by the processor cause the processor to program the forwarding unit to forward the flows to their destination based on the logical loop-free topology.

4. The device of claim 1, wherein the memory further includes instructions that when executed by the processor cause the processor to:
determine whether a first link of the links local to the device or the links associated with the other devices has failed based on at least one of the first status of the links local to the device and the second status of the links associated with the other devices in the ring network;
when the first link has failed, generate a second logical loop-free topology based upon the stored static physical configuration, the first status of the links local to the device and the second status of the links associated with the other devices in the ring network; and
determine a second allocation of flows to the links local to the device based on stored flow characteristics.

5. The device of claim 1, wherein the memory further includes instructions that when executed by the processor cause the processor to:
propagate a status of a link of the links local to the device throughout the ring network through a protocol exchange message if the first status of the links local to the device indicates that the link has failed.

6. The device of claim 1, wherein the flow characteristics include source address, destination address, Virtual Local Area Network (VLAN) Identification (ID), minimum bandwidth requirement, Audio Video Bridging (AVB) traffic class, stream priority level, and network connection points for each flow of the flows.

7. The device of claim 1, wherein the memory further includes instructions that when executed by the processor cause the processor to:
dynamically generate a database of flows in the device and their corresponding source address, destination address, Virtual Local Area Network (VLAN) Identification (ID), minimum bandwidth requirement, Audio Video Bridging (AVB) traffic class, stream priority level, and network connection points.

8. The device of claim 1, wherein the memory also stores a static database of the flows in the device and their corresponding source address, destination address, Virtual Local Area Network (VLAN) Identification (ID), minimum bandwidth requirement, Audio Video Bridging (AVB) traffic class, stream priority, and network connection points.

9. The device of claim 1, wherein the memory further includes instructions that when executed by the processor cause the processor to not use a spanning tree algorithm to determine the logical loop-free topology.

10. The device of claim 1, wherein the ring configuration is an Ethernet ring configuration over an Audio Video Bridging (AVB) network protocol.

11. A method in a device, wherein the device is in a ring network, comprising:
monitoring a first status of links associated with the device;
receiving a second status of links associated with other devices in the ring network;
independently generating a same logical loop-free topology as the other devices in the ring network based upon a stored static physical configuration, the first status of the links associated with the device and the second status of the links associated with the other devices in the ring network; and
determining an allocation of flows to the links associated with the device based on stored flow characteristics.

12. The method of claim 11, wherein the flows comprise Audio Video Bridging (AVB) flows and non-AVB flows, and wherein the determining an allocation of the flows to the links associated with the device comprises:
programming a transmit scheduler to provide a first percentage of bandwidth for the AVB flows while reserving a second percentage of bandwidth for the non-AVB flows.

13. The method of claim 12, further comprising: programming a forwarding unit to forward the flows to their destination based on the logical loop-free topology.

14. The method of claim 12, further comprising:
determining whether a first link of the links associated with the device has failed based on a first status signal;
when the first link has failed, generating a second logical loop-free topology based upon the stored static physical configuration, the first status of the links associated with the device, and the second status of the links associated with the other devices in the ring network; and
determining a second allocation of the flows to links based on the stored flow characteristics.

15. The method of claim 12, further comprising:
propagating a status of a link of the links local to the device throughout the ring network through a protocol exchange message when a first status signal indicates that the link local to the device has failed.

16. The method of claim 12, wherein the stored flow characteristics include source address, destination address, Virtual Local Area Network (VLAN) Identification (ID), minimum bandwidth requirement, Audio Video Bridging (AVB) traffic class, stream priority level, and network connection points for each flow.

17. The method of claim 12, further comprising:
dynamically generating a database of flows in the device and their corresponding source address, destination address, Virtual Local Area Network (VLAN) Identification (ID), minimum bandwidth requirement, Audio Video Bridging (AVB) traffic class, stream priority level and network connections.

18. The method of claim 12, further comprising:
storing a static database of flows in the device and their corresponding source address, destination address, Virtual Local Area Network (VLAN) Identification (ID), minimum bandwidth requirement, Audio Video Bridging (AVB) traffic class, stream priority, and network connection points.

19. The method of claim 12, further comprising:
not use a spanning tree algorithm to determine the logical loop-free topology.

20. The method of claim 12, wherein the ring configuration is an Ethernet ring configuration over an Audio Video Bridging (AVB) network protocol.

* * * * *